United States Patent

Ohtsu et al.

Patent Number: 5,858,079
Date of Patent: Jan. 12, 1999

[54] STRONTIUM BORATE PIGMENT COMPOSITION, METHOD OF MAKING SAME, AND PROCESSES OF IMPARTING ANTI-CORROSIVE, ANTI-BACTERIAL/ANTI-FUNGAL AND NON-FLAMMABLE PROPERTIES TO MATERIALS BY USING SAME

[75] Inventors: Koichi Ohtsu; Taizo Kaihatsu, both of Iwaki, Japan

[73] Assignee: Sakai Chemical Industry Co., Ltd., Osaka, Japan

[21] Appl. No.: 809,143

[22] PCT Filed: Nov. 18, 1996

[86] PCT No.: PCT/JP96/03380

§ 371 Date: Mar. 25, 1997

§ 102(e) Date: Mar. 25, 1997

[87] PCT Pub. No.: WO98/22538

PCT Pub. Date: May 28, 1998

[51] Int. Cl.⁶ .............. C09C 1/02; C09D 5/08; C09D 5/14; C09D 5/18
[52] U.S. Cl. .............. 106/462; 106/14.21; 106/14.39; 106/15.05; 106/18.13; 106/18.3; 252/601; 423/278; 423/289; 424/78.09; 424/660; 427/397.7; 428/403; 428/404; 428/920; 428/921
[58] Field of Search .............. 106/462, 482, 106/14.21, 14.39, 15.05, 18.13, 18.3; 252/601; 424/660, 78.09; 427/397.7, 397.8; 423/278, 289; 428/402, 403, 404, 920, 921

[56] References Cited

U.S. PATENT DOCUMENTS 3,060,049  10/1962  Buckman et al. ............ 106/642
3,380,836   4/1968  Robinson .................... 106/462

FOREIGN PATENT DOCUMENTS 672890  10/1963  Canada .................... 106/462
434391   6/1991  European Pat. Off. .
57-27923  2/1982  Japan .
60-090266 5/1985  Japan .
7-149516  6/1995  Japan .

*Primary Examiner*—Anthony Green
*Attorney, Agent, or Firm*—Nikaido, Marmelstein, Murray & Oram LLP

[57] ABSTRACT

The present invention provides a strontium borate pigment composition comprising particles of a strontium borate represented by the general formula (1):

$$\alpha SrO \cdot \beta B_2O_3 \cdot \gamma H_2O \tag{1}$$

(wherein $0 < \alpha \leq 3$, $0 < \beta \leq 4$, $0 \leq \gamma \leq 5$), the particles being coated with at least one compound selected from the group consisting of compounds represented by the formulae (2) to (6):

$$\delta SrO \cdot \epsilon SiO_2 \cdot \zeta H_2O \tag{2}$$

(wherein $0 < \delta \leq 3$, $0 < \epsilon \leq 2$, $0 \leq \zeta \leq 4$)

$$\eta SrO \cdot \theta Al_2O_3 \cdot \iota H_2O \tag{3}$$

(wherein $0 < \eta \leq 5$, $0 < \theta \leq 16$, $0 \leq \iota \leq 6$)

$$SrSO_4 \tag{4}$$

$$SrCO_3 \tag{5}$$

and $$SrHPO_4 \tag{6},$$

the pigment composition having an average particle diameter of 0.1 μm to 5 μm and a water-soluble content of not greater than 15% by weight as well as processes of imparting anti-corrosive, anti-bacterial, anti-fungal and non-flammable properties to materials by using the above pigment composition.

8 Claims, 8 Drawing Sheets

STRONTIUM BORATE PIGMENT COMPOSITION, METHOD OF MAKING SAME, AND PROCESSES OF IMPARTING ANTI-CORROSIVE, ANTI-BACTERIAL/ANTI-FUNGAL AND NON-FLAMMABLE PROPERTIES TO MATERIALS BY USING SAME

TECHNICAL FIELD

The present invention relates to a novel pigment composition having excellent anti-corrosive, anti-bacterial/anti-fungal and anti-flammable properties, a method of making the same, and processes of imparting anti-corrosive, anti-bacterial/anti-fungal and non-flammable properties to materials by utilizing the properties of the aforesaid pigment composition.

BACKGROUND ART

Conventionally, anti-corrosive paints containing an anti-corrosive pigment have been used for the corrosion prevention of a base material such as made of iron.

The Japanese Industrial Standards (JIS) specify eight kinds of anti-corrosive paints which differ depending on the kind of anti-corrosive pigments contained therein. Among those, six kinds of the anti-corrosive paints contain chromium-based or lead-based anti-corrosive pigments. The chromium-based anti-corrosive pigments specified by JIS include zinc chromate (ZPC type and ZTO type) and the like, and the lead-based anti-corrosive pigments include minium, lead suboxide, basic lead chromate and the like.

The above anti-corrosive pigments have superior anti-corrosive property and, therefore, have been widely used. However, they contain either chromium or lead which is harmful if absorbed into human bodies. Recently, there has been a growing demand for a pollution-free anti-corrosive pigment free from such harmful substances.

Examples of the conventionally known anti-corrosive pigments which contain neither chromium nor lead include phosphate-based pigments such as zinc phosphate and aluminum phosphate, and molybdate-based pigments such as zinc molybdate and calcium molybdate. However, any of the anti-corrosive pigments having superior anti-corrosive property comparable to that of the chromium-based or lead-based anti-corrosive pigments is yet to come in practice.

A barium metaborate, one of borate-based pigments, is also known as a low-pollution anti-corrosive pigment which contains neither chromium nor lead.

However, barium metaborate is specified to be a non-medical deleterious substance by the Japanese poisonous and Deleterious Substances Control Law and other applicable laws. Therefore, special attention should be given to the health and safety of a person who handles barium metaborate, and care should be taken not to allow people to directly touch a portion on which a paint containing the barium metaborate pigment is applied. Thus, the use of barium metaborate is limited by such situations.

Further, conventional anti-corrosive pigments such as zinc chromate are colored per se, thereby limiting the coloration of paints.

Inventors of the present invention have conducted several researches into a novel anti-corrosive pigment as an alternative to the conventional ones.

As a result, the inventors have had the findings that a strontium borate pigment represented by the general formula (1) is pollution-free and less toxic, and that it is excellent in anti-corrosive property and has no possibility of limiting the coloration of paints because it is white.

$$\alpha SrO \cdot \beta B_2O_3 \cdot \gamma H_2O \tag{1}$$

(wherein $0<\alpha\leq 3$, $0<\beta\leq 4$, $0\leq\gamma\leq 5$)

The inventors have also found a fact that the above strontium borate pigment is excellent not only in anti-corrosive property but also in anti-bacterial/anti-fungal and non-flammable properties.

However, it has been revealed that the anti-corrosive, anti-bacterial/anti-fungal and non-flammable properties cannot be maintained over a long period because the strontium borate pigment is water-soluble. Where the strontium borate pigment is dispersed in a material such as a paint or a molded product, penetration of moisture into the material causes the strontium borate pigment to dissolve and leach from the material or causes a paint coating film to be swelled and lifted, making it impossible to maintain the anti-corrosive, anti-bacterial/anti-fungal and non-flammable properties over an extended period.

The strontium borate pigment is typically prepared by reacting a water-soluble strontium salt with boric acid or a water-soluble borate in water. The strontium borate pigment thus prepared has large particle diameters, typically greater than about 7 μm and, therefore, exhibits a reduced dispersibility in the material. This results in unsatisfactory anti-corrosive, anti-bacterial/anti-fungal and non-flammable properties.

It is an object of the present invention to provide a novel strontium borate pigment composition which has an excellent dispersibility in a material and an excellent water resistance and thereby allows the material to maintain superior anti-corrosive, anti-bacterial/anti-fungal and non-flammable properties over an extended period, an efficient method of making the same, and processes of imparting anti-corrosive, anti-bacterial/anti-fungal and non-flammable properties to the material by using the strontium borate pigment composition.

DISCLOSURE OF THE INVENTION

The present invention provides a strontium borate pigment composition comprises particles of a strontium borate represented by the general formula (1):

$$\alpha SrO \cdot \beta B_2O_3 \cdot \gamma H_2O \tag{1}$$

(wherein $0<\alpha\leq 3$, $0<\beta\leq 4$, $0\leq\gamma\leq 5$), the particles being coated with at least one compound selected from the group consisting of compounds represented by the formulae (2) to (6):

$$\delta SrO \cdot \epsilon SiO_2 \cdot \zeta H_2O \tag{2}$$

(wherein $0<\delta\leq 3$, $0<\epsilon\leq 2$, $0\leq\zeta\leq 4$)

$$\eta SrO \cdot \theta Al_2O_3 \cdot \iota H_2O \tag{3}$$

(wherein $0<\eta\leq 5$, $0<\theta\leq 16$, $0\leq\iota\leq 6$)

$$SrSO_4 \tag{4}$$

$$SrCO_3 \tag{5}$$

and $$SrHPO_4 \tag{6},$$

the pigment composition having an average particle diameter of 0.1 μm to 5 μm and a water-soluble content of not greater than 15% by weight.

As described above, the strontium borate pigment composition of the present invention includes the water-soluble strontium borate particles coated with the at least one compound selected from the group consisting of the water-insoluble compounds of the general formula (2) to (6) and having a water-soluble content of not greater than 15% by weight. Therefore, the strontium borate pigment composition is excellent in water resistance and capable of maintaining anti-corrosive, anti-bacterial/anti-fungal and non-flammable properties over an extended period.

The strontium borate pigment composition has a small average particle diameter of 0.1 μm to 5 μm and, hence, has an excellent dispersibility in a material, exhibiting satisfactory anti-corrosive, anti-bacterial/anti-fungal and non-flammable properties in the material.

It should be noted that the water-soluble content is herein meant by the content (weight percentage) of water-soluble components which is determined in accordance with JIS K5101 Pigment Testing Method, Section 25: Water-soluble content, Paragraph 25.1: Boiling Exudation Method specified by Japanese Industrial Standards.

In order to produce the strontium borate pigment composition, the present invention provides a method comprising the steps of reacting a water-soluble strontium salt with boric acid or a water-soluble borate in water to provide an intermediate reaction product, and further reacting the intermediate reaction product with at least one compound selected from the group consisting of a water-soluble silicate, aluminum sulfate, sodium sulfate, sodium carbonate and ammonium dihydrogenphosphate. In accordance with the production method of the present invention, the production of the strontium borate pigment composition can be achieved simply by adding any of the aforesaid compounds to the intermediate reaction product resulting from the reaction of the water-soluble strontium salt with boric acid or the water-soluble borate for further reaction.

More specifically, the aforesaid compounds, when added to the reaction system for the reaction of the water-soluble strontium salt with boric acid or the water soluble borate, are decomposed by an acid remaining in the reaction system and heat generated in the reaction system, and the at least one compound selected from the group consisting of the compounds of the general formula (2) to (6) is deposited on surfaces of the strontium borate particles for coating thereof. Thus, the strontium borate pigment composition has a water-soluble content of not greater than 15% by weight. In addition, the coating suppresses the growth of the strontium borate particles which may otherwise result from further reaction of the water-soluble strontium salt with boric acid or the water-soluble borate, so that the strontium borate particles have an average particle diameter of 0.1 μm to 5 μm.

The process of imparting anti-corrosive properties of the present invention is adapted to impart the anti-corrosive property to a material such as a paint or a molded product, and comprises the step of blending the strontium borate pigment composition of the present invention with the material.

The process of this invention enables the material to maintain a superior anti-corrosive property over an extended period because the strontium borate pigment composition of the present invention has an excellent water resistance and an excellent dispersibility in the material as previously described.

The process of imparting anti-bacterial/anti-fungal properties of the present invention is adapted to impart the anti-bacterial/anti-fungal property to a material such as a paint or a molded material, and comprises the step of blending the strontium borate pigment composition of the present invention with the material.

The process of this invention enables the material to maintain a superior anti-bacterial/anti-fungal property over an extended period because the strontium borate pigment composition of the present invention has an excellent water resistance and an excellent dispersibility in the material as previously described.

The process of imparting non-flammable properties of the present invention is adapted to impart the non-flammable property to a material such as a paint or a molded product, and comprises the step of blending the strontium borate pigment composition of the present invention with the material.

The process of this invention enables the material to maintain a superior non-flammable property over an extended period because the strontium borate pigment composition of the present invention has an excellent water resistance and an excellent dispersibility in the material as previously described.

BEST MODE FOR CARRYING OUT THE INVENTION

Figure 1:
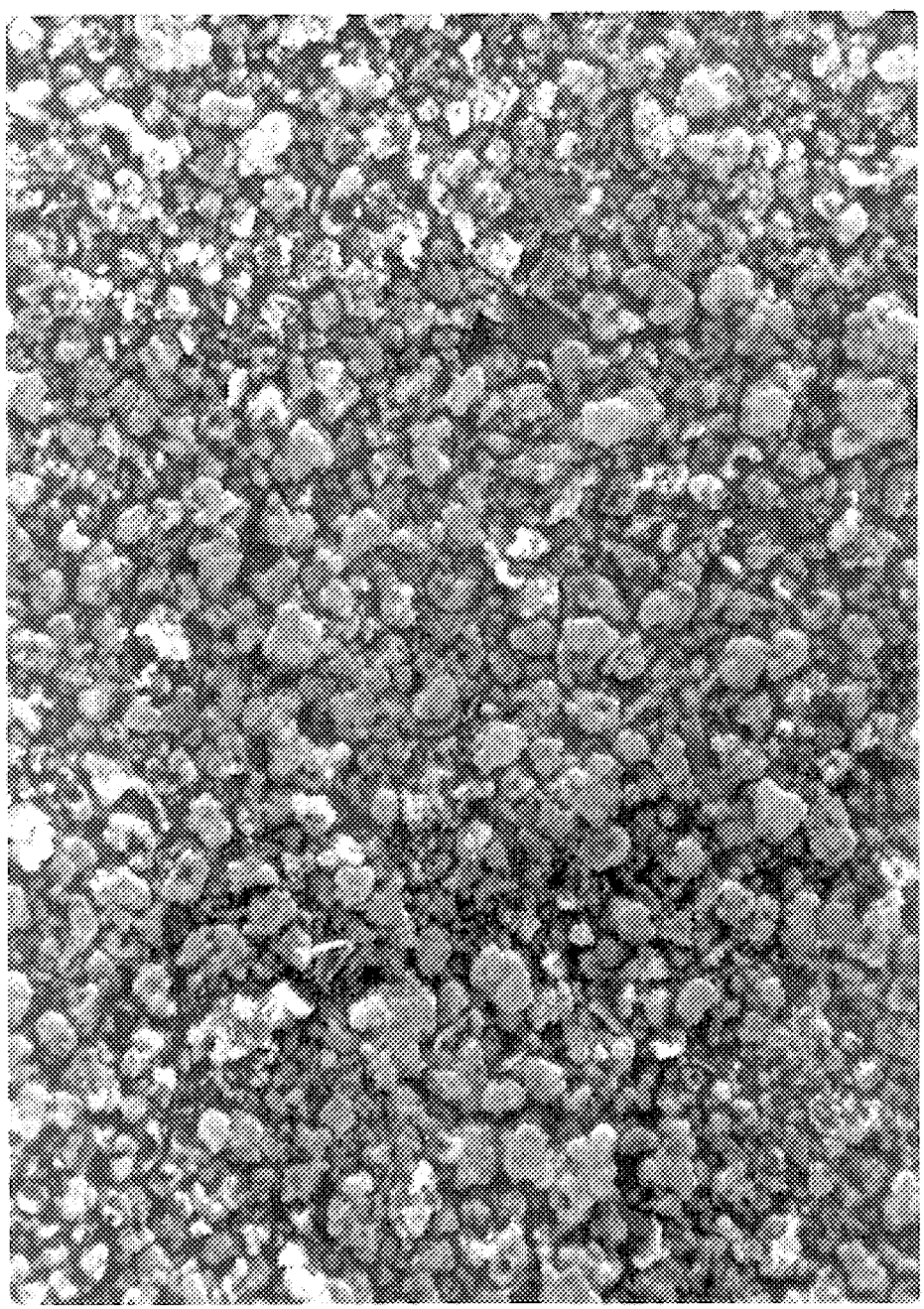
FIG. 1 is a scanning electron microscopic photograph illustrating the state of particles of a strontium borate pigment composition prepared in Example 1.

In accordance with one preferred embodiment of the present invention, celestite (a natural mineral, $SrSO_4$) is reduced with carbon by way of roasting to afford strontium sulfide (SrS) of a water-soluble strontium salt, as shown in the following reaction formula (i):

$$SrSO_4 + 4C \rightarrow SrS + 4CO \qquad (i)$$

Then, the reaction product is immersed in hot water to leach out strontium sulfide, and the residue is filtered off. Borax ($Na_2B_4O_7 \cdot 5H_2O$) of a water-soluble borate is added to the filtrate. Borax is reacted with strontium sulfide in the filtrate as shown in the following reaction formula (ii) to afford strontium metaborate ($SrO \cdot B_2O_3 \cdot H_2O$).

$$2SrS + Na_2B_4O_7 \cdot 5H_2O \rightarrow 2(SrO \cdot B_2O_3 \cdot H_2O) + 2NaSH + 2H_2O \qquad (ii)$$

The temperature of the hot water for leaching out strontium sulfide is preferably between 60° C. and 80° C. in consideration of the productivity and operation safety. The concentration of strontium sulfide leached out into the hot water is between 10 g/l and 120 g/l, preferably between 50 g/l and 70 g/l in consideration of the productivity.

Although the reaction shown in the reaction formula (ii) can proceed under atmospheric pressure, the resulting particles are too fine, having diameters of less than 0.1 μm. Therefore, the reaction is preferably carried out in an autoclave and the like under pressure to increase diameters of particles.

More specifically, the strontium sulfide solution is stirred in an autoclave or some other reaction vessel at a temperature higher than a solubility point, and borax of an amount required for the reaction is added little by little to the solution with stirring. After the temperature of the reaction solution is raised up to between 50° C. and 80° C., the reaction is allowed to proceed for 10 minutes to 3 hours under atmospheric pressure.

Where the other reaction vessel is used in the aforesaid blending step, the reaction solution is transferred into an autoclave, then heated up to between 100° C. to 150° C. at a gage pressure of 1.0 kg/cm to 3.0 kg/cm$^2$, and stirred for 1 hour to 5 hours.

The resulting reaction product is filtered by a conventional method, rinsed with water, dried and pulverized to afford bare strontium borate particles yet to be coated.

At this time, the molar ratio of boron in the water-soluble borate to strontium in the water-soluble strontium salt is $0<(B/Sr)\leq 3$, preferably $1\leq(B/Sr)\leq 5$.

A reaction in which boric acid is employed instead of borax proceeds under atmospheric pressure in accordance with the following reaction formula:

$$SrS+2H_3BO_3 \rightarrow SrO.B_2O_3.H_2O+H_2S\uparrow+H_2O \qquad (iii)$$

The reaction temperature and period are substantially the same as those employed for the foregoing reaction. The molar ratio of boron in boric acid to strontium in the water-soluble strontium salt is substantially the same as the ratio of boron in the water-soluble borate in the foregoing reaction.

A reaction in which strontium chloride is employed instead of strontium sulfide proceeds under atmospheric pressure in accordance with the following reaction formulae:

$$SrS+2HCl \rightarrow SrCl_2+2H_2S \qquad (iv)$$

$$2SrCl_2+Na_2B_4O_7.5H_2O+2NaOH \rightarrow 2(SrO.B_2O_3.H_2O)+4NaCl+4H_2O \qquad (v)$$

The reaction temperature and period and the molar ratio are substantially the same as those employed for the foregoing reactions.

Examples of water-soluble strontium salts other than the aforementioned include strontium hydroxide and strontium nitrate.

In the present invention, for the coating of the strontium borate particles with any of the compounds represented by the general formulae (2) to (6), one or more compounds selected from the group consisting of a water-soluble silicate, aluminum sulfate, sodium sulfate, sodium carbonate and ammonium dihydrogenphosphate are added as a coating material to the intermediate reaction product at any stage of the aforesaid production process. An exemplary water-soluble silicate is sodium silicate ($Na_2O.\kappa SiO_2.\lambda H_2O$, $0<\kappa\leq 3$, $0\leq\lambda\leq 9$)

The stage at which the aforesaid compounds are added is not particularly limited. In the production process employing the autoclave, the compounds are preferably added at either or both of the following stages:

(a) Before the reaction in the autoclave under pressure; and (b) After the reaction in the autoclave under pressure.

The compounds added at the stage (a) are effective to suppress the growth of the strontium borate particles which may otherwise result from the reaction of the water-soluble strontium salt with boric acid or the water-soluble borate.

The compounds added at the stage (b), on the other hand, is effective to reduce the water-soluble content of the strontium borate pigment composition.

Therefore, it is particularly preferred to add the compounds at the respective stages, but the addition may take place at either one of the stages.

The compounds to be added at the respective stages (a) and (b) may be either different or the same.

At the stage (b), the compounds may be added directly to the intermediate reaction product taken out of the autoclave. For formation of homogeneous coating on the surfaces of the strontium borate particles, the intermediate reaction product is preferably filtered by a conventional method, rinsed with water for removal of impurities, and subjected to repulping before the addition of the compounds.

After the addition of the compounds, the reaction mixture may simply be stirred at room temperature. For formation of firm coating, the reaction mixture is heated up to between 100° C. and 150° C., and the reaction is matured for 4 to 16 hours.

Upon completion of the reaction, the reaction product is filtered and rinsed with water for removal of impurities. Then, the product is dried and pulverized by means of a sample mill or the like. Thus, the strontium borate pigment composition of the present invention is obtained which includes particles of strontium borate of the general formula (1) coated with one or more compounds selected from the group consisting of the compounds of the general formulae (2) to (6).

The strontium borate particles, as a main component of the strontium borate pigment composition, include one or more compounds selected from the following exemplary compounds. These compounds are nontoxic and yet have superior anti-corrosive, anti-bacterial/anti-fungal and non-flammable properties.

$SrO.B_2O_3$ $SrO.2B_2O_3$ $2SrO.B_2O_3$ $SrO.3B_2O_3$ $3SrO.B_2O_3$ $SrO.3B_2O_3.5H_2O$ $SrO.4B_2O_3.2H_2O$ $SrO.B_2O_3.4H_2O$ $SrO.B_2O_3.H_2O$ $SrO.3B_2O_3.2H_2O$ $SrO.3B_2O_3.4H_2O$

Among compounds which are used for the coating of the strontium borate particles, those represented by the general formula (2) include one or more of the following compounds.

$SrO.2SiO_2$ $2SrO.SiO_2$ $3SrO.SiO_2$ $SrO.SiO_2.H_2O$ $SrO.2SiO_2.H_2O$ $2SrO \cdot SiO_2 \cdot H_2O$ $2SrO \cdot 2SiO_2 \cdot 3H_2O$ $3SrO \cdot 2SiO_2 \cdot 2H_2O$ $3SrO \cdot 2SiO_2 \cdot 3H_2O$ $3SrO \cdot 2SiO_2 \cdot 4H_2O$ $3SrO \cdot 2SiO_2 \cdot 4H_2O$ Among compounds which are used for the coating of the strontium borate particles, those represented by the general formula (3) include one or more of the following compounds.

$SrO \cdot Al_2O_3$ $SrO \cdot 6Al_2O_3$ $3SrO \cdot Al_2O_3$ $3SrO \cdot 16Al_2O_3$ $5SrO \cdot Al_2O_3$ $5SrO \cdot 4Al_2O_3$ $3SrO \cdot Al_2O_3 \cdot 6H_2O$ As described above, the strontium borate pigment composition of the present invention has a limited average particle diameter of 0.1 μm to 5 μm and a limited water-soluble content of not greater than 15% by weight.

A pigment composition having an average particle diameter of greater than 5 μm offers an insufficient dispersibility in the material as previously mentioned, so that the anti-corrosive, anti-bacterial/anti-fungal and non-flammable properties thereof are unsatisfactory.

A pigment composition having an average particle diameter of smaller than 0.1 μm offers an insufficient dispersibility in the material. In addition, the particles of strontium borate per se have a smaller size with thin coating formed thereon.

Therefore, it is impossible to maintain the anti-corrosive, anti-bacterial/anti-fungal and non-flammable properties over a long period.

A pigment composition having a water-soluble content of greater than 15% by weight offers an insufficient water resistance as previously mentioned. Therefore, it is impossible to maintain the anti-corrosive, anti-bacterial/anti-fungal and non-flammable properties over a long period.

The average particle diameter of the strontium borate pigment composition is more preferably between 0.3 μm and 5 μm, further preferably between 0.5 μm and 3 μm.

The water-soluble content is more preferably between 0.5% and 10% by weight, further preferably between 1% and 8% by weight.

The average particle diameter and water-soluble content of the strontium borate pigment composition can be controlled within the aforesaid ranges by controlling the amount of the compounds to be added as the coating material in the aforementioned reaction process.

More specifically, the control of the average particle diameter of the strontium borate pigment composition is achieved by controlling the amount of the compounds to be added before the reaction in the autoclave under increased pressure, while the control of the water-soluble content is achieved by controlling the amount of the compounds to be added after the reaction.

An alternative method for controlling the average particle diameter of the strontium borate pigment composition is to control the reaction temperature and the stirring rate in the reaction process or to control the load amount of a starting material, i.e., the water-soluble strontium salt, boric acid or the water-soluble borate.

The strontium borate pigment composition of the present invention, by virtue of its properties, is used for imparting the anti-corrosive, anti-bacterial, anti-fungal and non-flammable properties to paints, molded products and the like.

In the process of imparting anti-corrosive properties utilizing the anti-corrosive property of the strontium borate pigment composition, for example, the strontium borate pigment composition of the present invention is blended with any of various known vehicles for preparation of an anti-corrosive paint, which is applied on a surface of a base material such as of iron, as previously described.

Examples of such anti-corrosive paints include oil paints containing a semi-drying oil or a drying oil such as linseed oil, tung oil or soybean oil, cellulose derivative paints containing nitrocellulose or ethylcellulose, phenol resin paints, alkyd resin paints (short-oil type, middle-oil type and long-oil type), aminoalkyd resin paints, acrylic resin paints, fluoro-resin paints, photo-curable or catalyst-curable unsaturated resin paints, epoxy resin paints, polyurethane paints, silicone paints, emulsion paints, and water-soluble resin paints.

The strontium borate pigment composition of the present invention is contained in an anti-corrosive paint in an amount ranging from 0.1% to 50% by weight, preferably from 5% to 10% by weight of the total amount of the anti-corrosive paint.

In the process of imparting anti-bacterial/anti-fungal properties, the strontium borate pigment composition of the present invention is blended, for example, with materials which need anti-bacterial properties such as paints to be applied on wall and floor in medical facilities and food processing plants, fiber forming materials which are made into fibers for cloths and towels to be used in the medical facilities and food processing plants, and molding materials which are made into containers for perishable foods and tableware; and with materials which need anti-fungal properties such as joint materials to be used for a bathroom and kitchen, plastic molding materials which are made into plastic products to be used in a bathroom and kitchen, and paints to be applied on interior and exterior walls of a building in a humid environment.

In the process of imparting non-flammable properties, the strontium borate pigment composition of the present invention is blended, for example, with materials such as plastic molding materials which are made into plastic components of automobiles, electrical appliances, and building materials which threaten the cause of fire.

EXAMPLES

The present invention will hereinafter be described in detail by way of examples thereof. It should be understood, however, that the invention is not to be limited to the following examples.

Preparation of Strontium Borate Pigment

Example 1

In a 1-liter beaker, 500 ml of an aqueous solution of strontium sulfide (60 g/l) was heated at 75° C., and 33.3 g of borax (pentahydrate salt) was added thereto little by little with stirring at a stirring rate of 600 rpm within 30 minutes.

The solution was continuously stirred for 5 minutes after the completion of the addition of borax, and then 10.2 g of sodium silicate (JIS No. 3) was added little by little to the solution with stirring within 30 minutes.

The resulting solution was continuously stirred for 5 minutes after the completion of the addition of sodium silicate, and then heated up to 90° C. (primary heating) with stirring within 40 minutes. When the temperature of the solution reached 90° C., the solution was transferred into a 1-liter autoclave preheated at 90° C., in which the solution was continuously stirred at a stirring rate of 1,000 rpm under atmospheric pressure for maturation of the reaction.

In turn, with the autoclave being sealed, the solution was heated up to 125° C. with stirring within 40 minutes. After the temperature of the solution reached 125° C., the reaction was matured at this temperature at a gage pressure of 1.5 kg/cm$^2$ for 120 minutes.

Then, the heating was stopped and the autoclave was cooled. When the temperature of the solution was lowered to 70° C., the solution was taken out of the autoclave, and a solid cake was removed from the solution by filtration.

After the cake was rinsed with water until the electrical conductivity of the water used for the rinsing became constant, the rinsed cake was dried and pulverized by means of a sample mill. Thus, a white particulate strontium borate pigment composition was obtained.

The result of an analysis of the strontium borate pigment composition thus obtained is shown below. The SrO content, the $B_2O_3$ content and the $SiO_2$ content were determined by way of the EDTA method, the mannitol method and the weighing method, respectively.

SrO content: 50.7%

$B_2O_3$ content: 30.3%

$SiO_2$ content: 4.8%

A scanning electronic microscopic photograph (×1,000 magnification) of the strontium borate pigment composition is shown in FIG. 1.

Example 2

A white particulate strontium borate pigment composition was prepared in substantially the same manner as in Example 1, except that the amount of sodium silicate (JIS No. 3) was 44.88 g.

The result of an analysis of the strontium borate pigment composition thus prepared is shown below.

SrO content: 43.9%

$B_2O_3$ content: 22.6%

$SiO_2$ content: 17.2%

Figure 2:
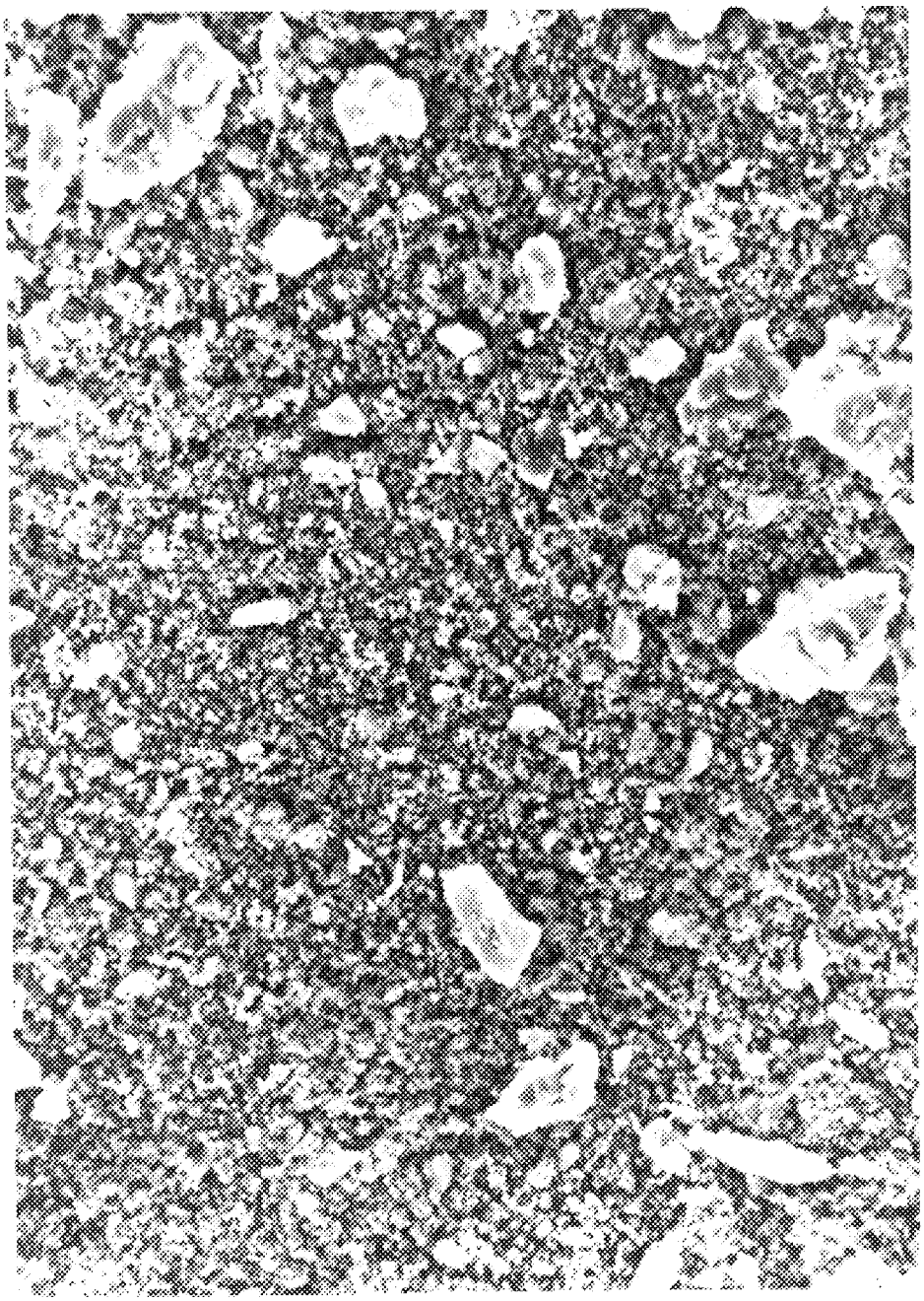
FIG. 2 is a scanning electron microscopic photograph illustrating the state of particles of a strontium borate pigment composition prepared in Example 2.

A scanning electronic microscopic photograph (×1,000 magnification) of the strontium borate pigment composition is shown in FIG. 2.

Comparative Example 1

A white particulate strontium borate pigment composition was prepared in substantially the same manner as in Example 1, except that sodium silicate (JIS No. 3) was not added.

The result of an analysis of the strontium borate pigment composition thus prepared is shown below.

SrO content: 54.2%

$B_2O_3$ content: 37.0%

Figure 3:
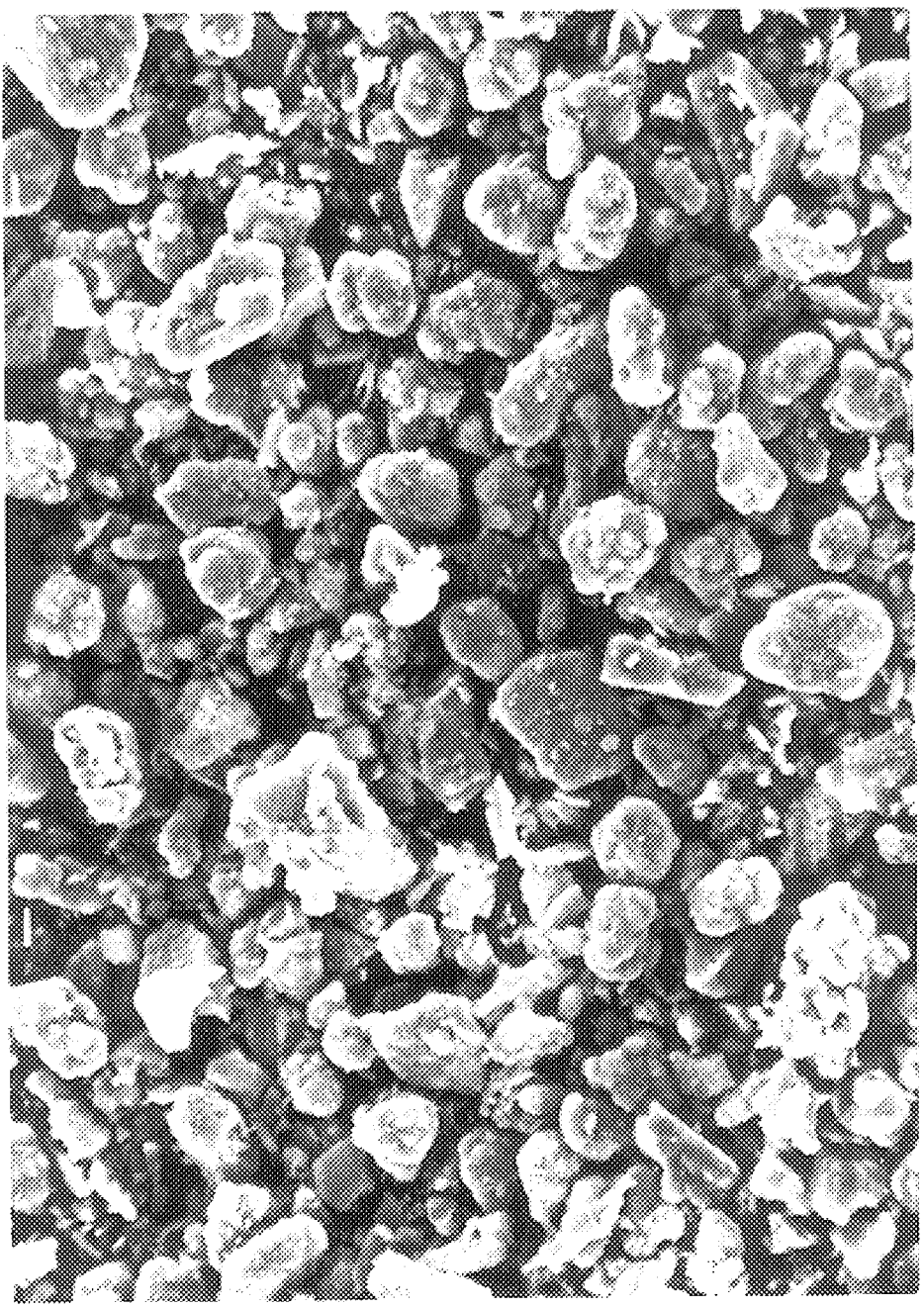
FIG. 3 is a scanning electron microscopic photograph illustrating the state of particles of a strontium borate pigment composition prepared in Comparative Example 1.

A scanning electronic microscopic photograph (×1,000 magnification) of the strontium borate pigment composition is shown in FIG. 3.

Example 3

In a 1-liter autoclave, 650 ml of an aqueous solution of strontium sulfide (60 g/l) was heated up to 75° C. under atmospheric pressure, and 33.3 g of borax (pentahydrate salt) was added thereto little by little with stirring at a stirring rate of 600 rpm within 30 minutes.

The solution was continuously stirred for 5 minutes after the completion of the addition of borax, and then 10.2 g of sodium silicate (JIS No. 3) was added little by little to the solution with continuous stirring within 30 minutes.

The solution was continuously stirred for 5 minutes after the completion of the addition of sodium silicate, and the stirring rate was changed to 1,000 rpm. The resulting solution was continuously stirred under atmospheric pressure for maturation of the reaction.

In turn, with the autoclave being sealed, the solution was heated up to 125° C. within 120 minutes with continuous stirring. After the temperature of the solution reached 125° C., the reaction was matured at this temperature at a gage pressure of 1.5 kg/cm$^2$ for 240 minutes.

Then, the heating was stopped and the autoclave was cooled. When the temperature of the solution was lowered to 75° C., the solution was taken out of the autoclave, and a solid cake was removed from the solution by filtration.

After the cake was rinsed with water until the electrical conductivity of the water used for the rinsing was reduced to lower than 2,000 μS, the rinsed cake was transferred into the autoclave, and water was added thereto to a total volume of 500 ml for repulping and heated up to 80° C. under atmospheric pressure with stirring.

In turn, 10.2 g of sodium silicate (JIS No. 3) was added little by little to the resulting mixture with continuous stirring within 10 minutes and, with the autoclave being sealed, the reaction was matured at 125° C. at a gage pressure of 1.5 kg/cm$^2$ for 16 hours.

After a lapse of 16 hours, the heating was stopped, and the autoclave was cooled. Then, the resulting solution was taken out of the autoclave, and a solid cake was removed from the solution by filtration.

After the cake was rinsed with water until the electrical conductivity of the water used for the rinsing became constant, the rinsed cake was dried and pulverized by means of a sample mill. Thus, a white particulate strontium borate pigment composition was obtained.

The result of an analysis of the strontium borate pigment composition thus obtained is shown below.

SrO content: 55.8%

$B_2O_3$ content: 26.9%

$SiO_2$ content: 9.0%

Figure 4:
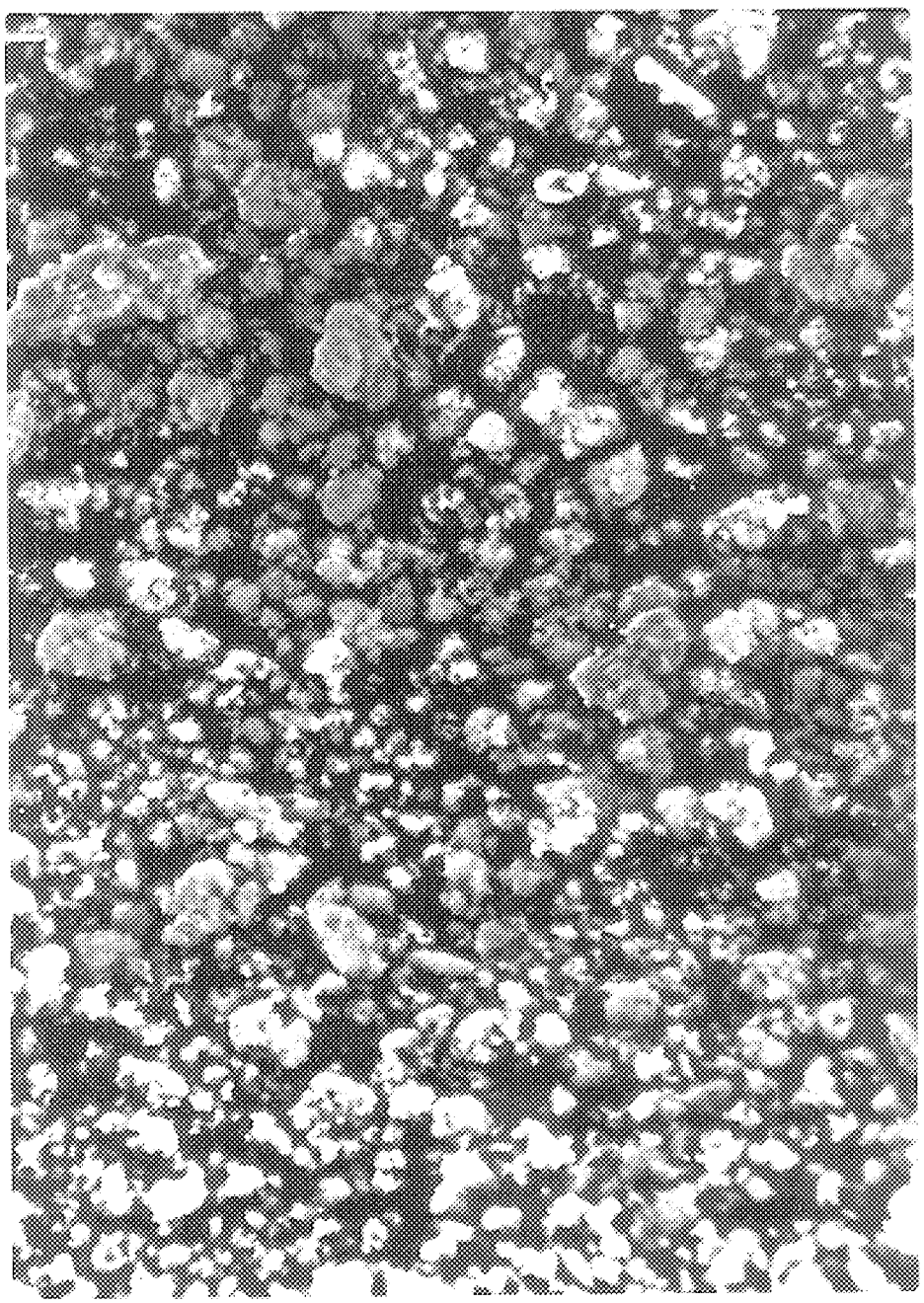
FIG. 4 is a scanning electron microscopic photograph illustrating the state of particles of a strontium borate pigment composition prepared in Example 3.

A scanning electronic microscopic photograph (×1,000 magnification) of the strontium borate pigment composition is shown in FIG. 4.

Example 4

A white particulate strontium borate pigment composition was prepared in substantially the same manner as in Example 3, except that the cake was dispersed by Red Devil Paint Conditioner for 30 minutes in the repulping step and 48 ml of an aqueous solution of aluminum sulfate (95.1 g/l) was added little by little instead of the sodium silicate solution within 10 minutes after the repulping.

The result of an analysis of the strontium borate pigment composition thus prepared is shown below. The $Al_2O_3$ content was determined by way of a chemical analysis employing an atomic absorption spectrophotometer.

SrO content: 43.7%

$B_2O_3$ content: 23.0%

$SiO_2$ content: 4.2%

$Al_2O_3$ content: 3.8%

Figure 5:
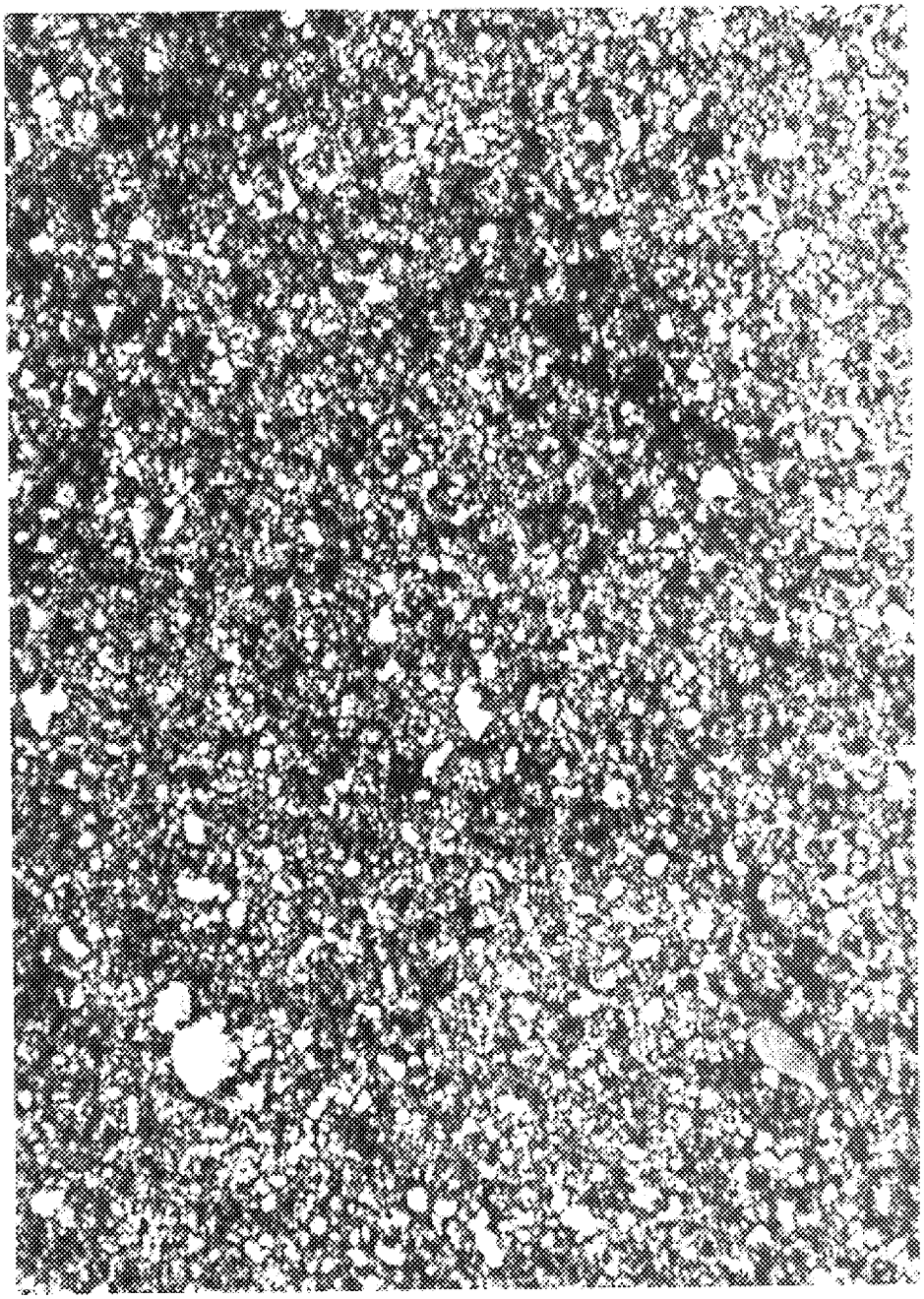
FIG. 5 is a scanning electron microscopic photograph illustrating the state of particles of a strontium borate pigment composition prepared in Example 4.

A scanning electronic microscopic photograph (×1,000 magnification) of the strontium borate pigment composition is shown in FIG. 5.

Example 5

A white particulate strontium borate pigment composition was prepared in substantially the same manner as in Example 3, except that 30 ml of an aqueous solution of Glauber's salt (200 g/l) was added little by little instead of the sodium silicate solution within 10 minutes after the repulping.

The result of an analysis of the strontium borate pigment composition thus prepared is shown below. The $SrSO_4$ content was determined by the weighing method.

SrO content: 44.0%
$B_2O_3$ content: 25.1%
$SiO_2$ content: 3.8%
$SrSO_4$ content: 10.7%

Figure 6:
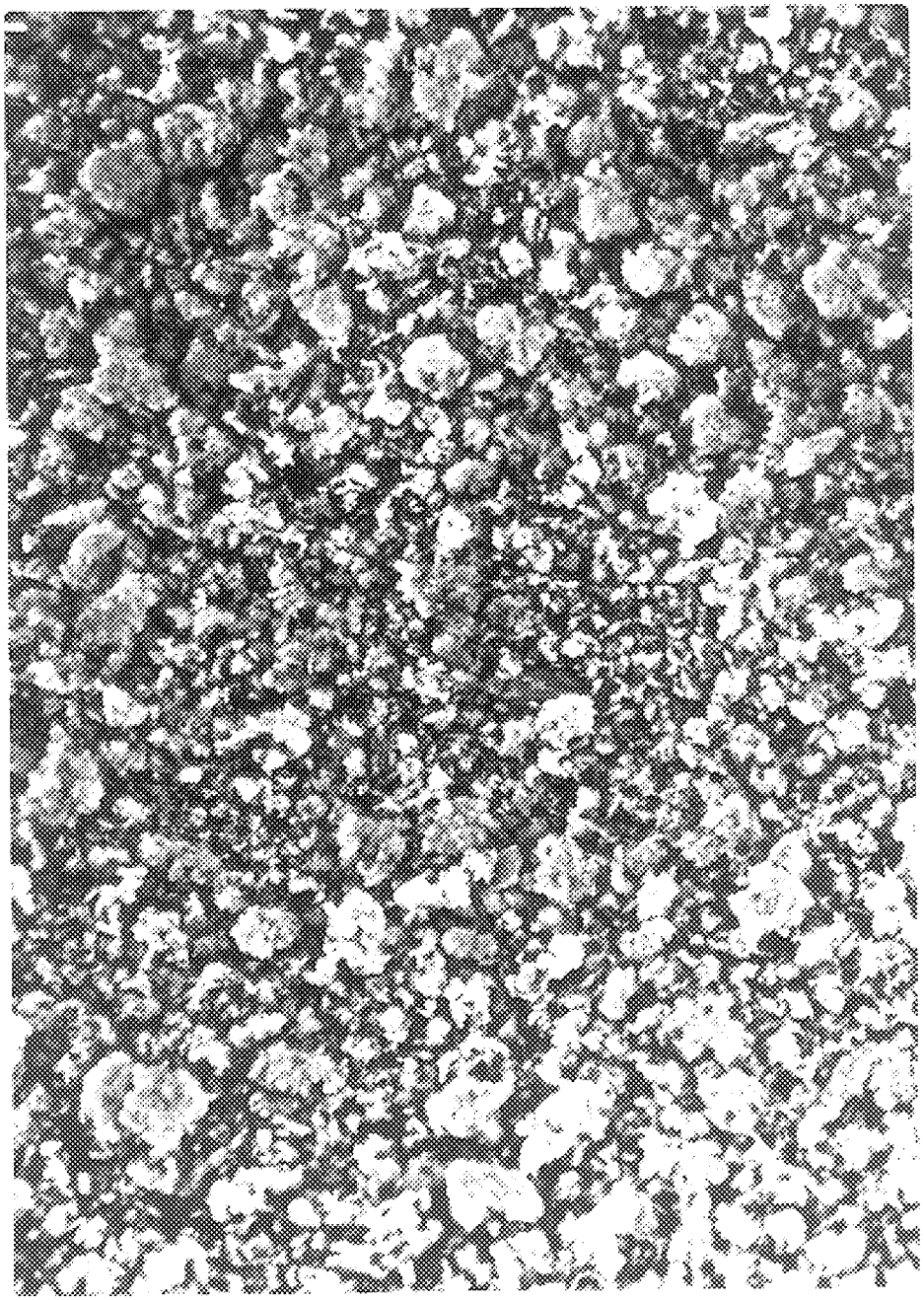
FIG. 6 is a scanning electron microscopic photograph illustrating the state of particles of a strontium borate pigment composition prepared in Example 5.

A scanning electronic microscopic photograph (×1,000 magnification) of the strontium borate pigment composition is shown in FIG. 6.

Example 6

The step for the maturation in the autoclave at 125° C. for 240 minutes and the preceding steps were performed in substantially the same manner as in Example 3, except that the load amount of the strontium sulfide solution (60 g/l) was 800 ml.

In turn, the heating was stopped and the autoclave was cooled. When the temperature of the resulting solution was lowered to 75° C., 34 ml of an aqueous solution of Glauber's salt (200 g/l) was added to the solution little by little within 30 minutes and then the resulting solution was stirred under atmospheric pressure for 30 minutes.

Then, the stirring was stopped, and the solution was taken out of the autoclave. A solid cake was removed from the solution by filtration.

After the cake was rinsed with water until the electrical conductivity of the water used for the rinsing became constant, the rinsed cake was dried and pulverized by means of a sample mill. Thus, a white particulate strontium borate pigment composition was obtained.

The result of an analysis of the strontium borate pigment composition thus obtained is shown below.

SrO content: 42.5%
$B_2O_3$ content: 20.9%
$SiO_2$ content: 3.8%
$SrSO_4$ content: 12.3%
Water content (Ig loss): 7.1%

Example 7

A white particulate strontium borate pigment composition was prepared in substantially the same manner as in Example 6, except that the load amount of the strontium sulfide solution (60 g/l) was 500 ml, the amount of the Glauber's salt solution (200 g/l) was 32.6 ml and the reaction after the addition of the Glauber's salt solution was matured at 75° C. under atmospheric pressure for 120 minutes.

The result of an analysis of the strontium borate pigment composition thus prepared is shown below.

SrO content: 42.0%
$B_2O_3$ content: 26.7%
$SiO_2$ content: 3.8%
$SrSO_4$ content: 12.9%

Example 8

The step for the maturation in the autoclave at 125° C. for 240 minutes and the preceding steps were performed in substantially the same manner as in Example 3, except that the load amount of the strontium sulfide solution (60 g/l) was 750 ml and 35 ml of an aqueous solution of sodium carbonate (106 g/l) was added little by little instead of the sodium silicate solution within 30 minutes.

In turn, the heating was stopped and the autoclave was cooled. When the temperature of the solution was lowered to 75° C., the solution was taken out of the autoclave, and a solid cake was removed from the solution by filtration.

After the cake was rinsed with water until the electrical conductivity of the water used for the rinsing became constant, the rinsed cake was dried and pulverized by means of a sample mill. Thus, a white particulate strontium borate pigment composition was obtained.

The result of an analysis of the strontium borate pigment composition thus obtained is shown below. The $SrCO_3$ content was determined by way of a chemical analysis by $CO_2$ collection.

SrO content: 41.6%
$B_2O_3$ content: 26.3%
$SrCO_3$ content: 8.0%

Example 9

A white particulate strontium borate pigment composition was prepared in substantially the same manner as in Example 3, except that 50 ml of an aqueous solution of sodium carbonate (106 g/l) was added little by little instead of the sodium silicate solution within 10 minutes after the repulping.

The result of an analysis of the strontium borate pigment composition thus prepared is shown below.

SrO content: 47.2%
$B_2O_3$ content: 23.9%
$SiO_2$ content: 4.4%
$SrCO_3$ content: 11.5%

Figure 7:
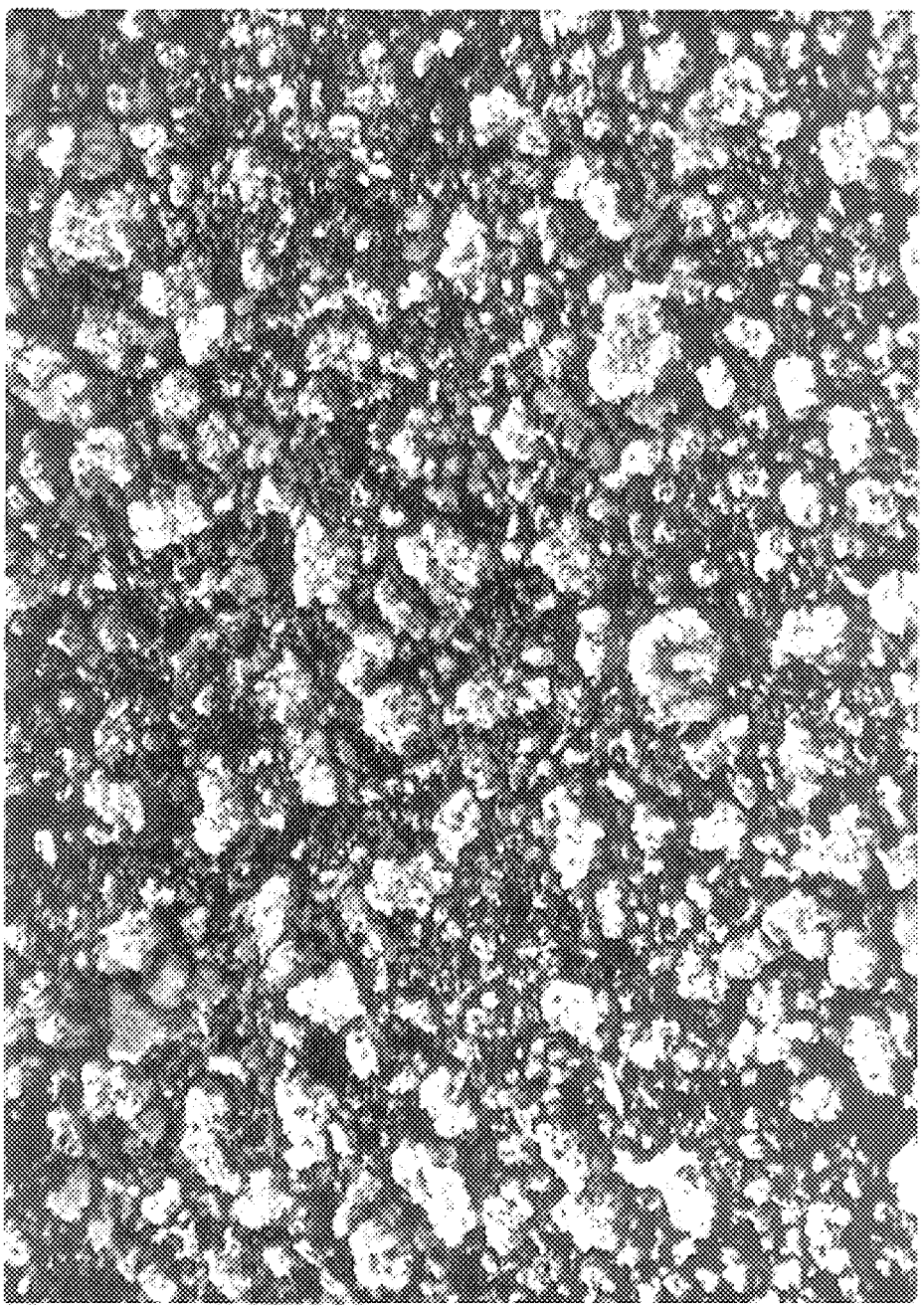
FIG. 7 is a scanning electron microscopic photograph illustrating the state of particles of a strontium borate pigment composition prepared in Example 9.

A scanning electronic microscopic photograph (×1,000 magnification) of the strontium borate pigment composition is shown in FIG. 7.

Example 10

A white particulate strontium borate pigment composition was prepared in substantially the same manner as in Example 3, except that 34 ml of an aqueous solution of ammonium dihydrogenphosphate (130 g/l) was added little by little instead of the sodium silicate solution within 10 minutes after the repulping.

The result of an analysis of the strontium borate pigment composition thus prepared is shown below.

SrO content: 50.5%
$B_2O_3$ content: 27.0%
$SiO_2$ content: 3.8%
$SrHPO_4$ content: 12.4%

Figure 8:
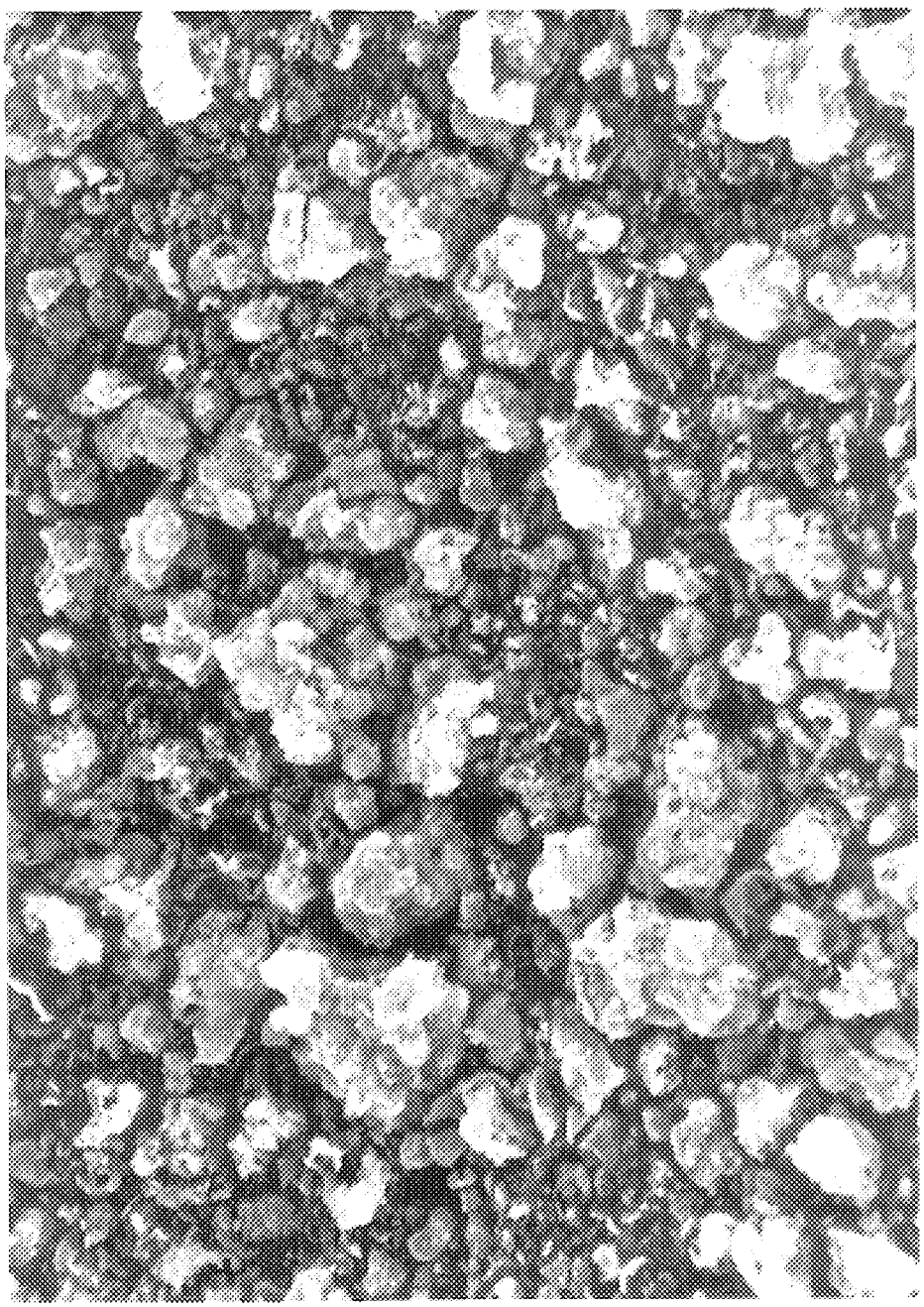
FIG. 8 is a scanning electron microscopic photograph illustrating the state of particles of a strontium borate pigment composition prepared in Example 10.

A scanning electronic microscopic photograph (×1,000 magnification) of the strontium borate pigment composition is shown in FIG. 8.

Example 11

The step for the maturation in the autoclave at 125° C. for 240 minutes and the preceding steps were performed in substantially the same manner as in Example 3, except that the load amount of the strontium sulfide solution (60 g/l) was 800 ml and the amount of sodium silicate (JIS No. 3) was 20.4 g.

In turn, the heating was stopped and the autoclave was cooled. When the temperature of the resulting solution reached 75° C., 50 ml of an aqueous solution of strontium chloride (hexahydrate salt) (10 g/50 ml) was added to the solution under atmospheric pressure with stirring.

The resulting solution was stirred for 20 minutes, and then 50 ml of an aqueous solution of ammonium dihydrogenphosphate (5.2 g/50 ml) was added little by little thereto with continuous stirring within 30 minutes.

After the resulting solution was further stirred for 20 minutes, the solution was taken out of the autoclave, and a solid cake was removed from the solution by filtration.

In turn, the cake was rinsed with water until the electrical conductivity of the water used for the rinsing became constant. Thereafter, the rinsed cake was dried and pulverized by means of a sample mill. Thus, a white particulate strontium borate pigment composition was obtained.

The result of an analysis of the strontium borate pigment composition thus obtained is shown below.

SrO content: 34.3%
$B_2O_3$ content: 24.4%
$SrO_2$ content: 8.6%
$SrHPO_4$ content: 10.9%

Measurement of Average Particle Diameter

The average particle diameters ($\mu$m) of the respective strontium borate pigment compositions prepared in the Examples and the Comparative Example were determined in the following manner by means of a particle specific surface area measuring apparatus (SS-100 Model available from Shimadzu Corporation).

1. Water was introduced from a water container into a measurement tube through a four-way cock to be filled in the tube between a bottom outlet and an S graduation point, and the cock was closed.

2. A sample was charged in a sample cylinder, which was connected to the apparatus with fitting faces greased.
   Sample charge amount: 2.2 g
   Ring used: 11 mm 3. The bottom outlet was raised or lowered by drawing a stopper for adjustment of an osmotic pressure $\Delta P$.

4. A cock of the bottom outlet was opened, and a time t required for the water surface in the measurement tube to be lowered from 0-cc graduation point to 10-cc graduation point was measured by a stopwatch.

5. An attached slide rule was used for determination of the average particle diameter. More specifically, (A) the thickness L of the sample layer and the osmotic pressure $\Delta P$ were set at respective graduation points, (B) a temperature scale at the left end of a fan-shaped rotary plate was set at a current room temperature, (C) an outside graduation point (average particle diameter, $\mu$m) corresponding to a graduation point of a time t/Q required for unit-volume air to pass through the sample layer was read on the basis of the time t previously measured.

Determination of Water-Soluble Content

The water-soluble contents (wt %) of the respective strontium borate pigment compositions prepared in the Examples and the Comparative Example were determined in accordance with JIS K-5101 Pigment Testing Method, Section 25: Water-soluble content, Paragraph 25.1: Boiling Exudation Method previously described.

More specifically, after 5 g of a sample was wetted with a small amount of ethanol (99.5), and 200 ml of pure water was added thereto, and then, the mixture was boiled for 5 minutes. Then, the sample was filtered with a filter paper (5C filter paper for quantitative analysis) for constant weight filtration. In turn, 100 ml of the filtrate, after being weighed, was evaporated to dryness, and then the deposited solid mass (water-soluble component) was weighed. The water-soluble content (wt %) was calculated from the following equation:

$$\text{Water-soluble content (wt \%)} = \frac{\text{Weight of solid mass} \times 250}{\text{Weight of sample} \times 100} \times 100$$

The results are shown in Table 1.

TABLE 1

|  | Average particle diameter ($\mu$m) | Water-soluble content (wt %) |
| --- | --- | --- |
| Comparative Example 1 | 7.6 | 16.3 |
| Example 1 | 1.0 | 13.7 |
| Example 2 | 1.4 | 7.2 |
| Example 3 | 1.7 | 5.5 |
| Example 4 | 1.2 | 9.0 |
| Example 5 | 2.0 | 6.4 |
| Example 6 | 2.3 | 6.8 |
| Example 7 | 0.3 | 13.7 |
| Example 8 | 0.4 | 13.0 |
| Example 9 | 1.4 | 7.0 |
| Example 10 | 1.1 | 11.7 |
| Example 11 | 4.5 | 9.7 |

Process of Imparting Anti-Corrosive Properties Using Strontium Borate Pigment

1. Preparation of anti-corrosive paints a) Water-soluble melamine alkyd resin paints An anti-corrosive pigment composition and carbon black were employed as a pigment composition component, and the pigment composition weight concentration (P.W.C.) of carbon black was kept constant at 4%. A water-soluble alkyd resin (available under the trade name of "WATERSOL S-118" from Dainippon Ink & Chemicals, Inc., and having a non-volatile content of 60%) and a water-soluble melamine resin (available under the trade name of "WATERSOL S-695 from Dainippon Ink & Chemicals, Inc., and having a non-volatile content of 65%) were employed as a resin component in a weight ratio of 5/95. A diluent mixture containing butylcellulose and water in a weight ratio of 2/8 was used in half the amount of the resin component. The content ratio is shown in Table 2.

The P.W.C. of the anti-corrosive pigment composition was calculated from the following equation:

$$P.W.C. \text{ (wt \%)} = \frac{Wrpp}{Wnvm + Wpig} \times 100$$

wherein Wrpp, Wnvm and Wpig are the weight of the anti-corrosive pigment composition, the total weight of the non-volatile components including the resin component, and the weight of the pigment composition component, respectively.

The total P.W.C. of the pigment composition component was calculated from the following equation:

$$\text{Total } P.W.C. \text{ (wt \%)} = \frac{Wpig}{Wnvm + Wpig} \times 100$$

wherein Wnvm and Wpig are the total weight of the non-volatile components including the resin component and the weight of the pigment composition component, respectively.

TABLE 2

Water-soluble melamine alkyd resin paint

| Contents | Weight ratio (Part by weight) |
|---|---|
| Mill base | |
| Anti-corrosive pigment composition | 1.23 |
| Carbon black | 1.66 |
| WATERSOL S-118 | 3.45 |
| Butylcellosolve | 2.76 |
| Water | 11.02 |
| Let-down | |
| WATERSOL S-118 | 58.11 |
| WATERSOL S-695 | 3.03 |
| Butylcellosolve | 3.77 |
| Water | 15.09 |
| P. W. C. (wt %) of anti-corrosive pigment composition | 3.0 |
| Total P. W. C. (wt %) | 7.0 |

In a mill base process (in which the pigment composition component was blended with and dispersed in the resin component and diluent for preparation of a mill base), the P.W.C. was about 50%, and the diluent component was used in five times the amount of the resin component. The mill base blended with glass beads (diameter: 1.5 mm) in a weight ratio of 1:3 was stirred for 40 minutes for dispersion. In a let-down process (in which the resin component and the diluent were added to the aforesaid mill base for preparation of a paint), the mixture was stirred for 20 minutes for dispersion.

(b) Epoxy emulsion resin paints

An anti-corrosive pigment composition, carbon black, calcium carbonate and "HOMOCAL D" (calcium carbonate available from Shiraishi Calcium, Ltd.) were employed as a pigment composition component. An emulsion resin (available under the trade name of "VONCORT EC-740" from Dainippon Ink & Chemicals Inc., and having a non-volatile content of 40%) and normal-drying epoxyester resin (available under the trade name of "WATERSOL CD-540" from Dainippon Ink & Chemicals Inc., and having a non-volatile content of 40%) were employed as a resin component. In Table 3, "modified EC-740" is a modification of the aforesaid VONCORT EC-740 which is modified by adding 2 parts by weight of Texanol, 2 parts by weight of Butylcellosolve and 2 parts by weight of water were added to 100 parts by weight of EC-740.

For preparation of a paint, a mill base blended with glass beads (diameter: 1.5 mm) in a weight ratio of 1:3 was stirred for 40 minutes for dispersion. In a let-down process, the paint mixture was stirred for 20 minutes for dispersion. The content ratio is shown in Table 3.

TABLE 3

Epoxy emulsion resin paint

| Ingredients | Weight ratio (Parts by weight) |
|---|---|
| Mill base | |
| Anti-corrosive pigment composition | 2.18 |
| Carbon black | 1.30 |
| Calcium carbonate | 0.32 |
| HOMOCAL D | 4.91 |
| SN-373 | 0.71 |
| BYK-080 | 0.04 |
| CD-540 | 26.06 |
| Water | 5.00 |
| Let-down | |
| Modified EC-740 | 64.51 |
| Dicnate 3111 | 0.52 |
| P. W. C. (wt %) of anti-corrosive pigment composition | 5.0 |
| Total P. W. C. (wt %) | 20.0 |

In Table 3, "SN-373" is an anti-foaming agent available from Sanopco, Ltd. "BYK-080" is a surfactant available from BYK-Chemie GmbH. "Dicnate 3111" is a desiccant available from Dainippon Ink & Chemicals Inc.

2. Method for evaluation of storage stability of paints and results

The initial viscosities (cps) of the water-soluble melamine alkyd resin paints and epoxy emulsion resin paints prepared in the aforesaid manner were measured with revolution at velocities of 6 rpm and 60 rpm, and then the thixotropic factors T.F. of the respective paints were determined from the following equation:

$$F.T. = \frac{\text{Viscosity } (cps) \text{ at 6 rpm}}{\text{Viscosity } (cps) \text{ at 60 rpm}}$$

After the pigment compositions were stored in sealed containers at 40° C. for 7 days, the viscosities (final viscosities, cps) thereof were measured under the same conditions as described above, and then the thixotropic factors thereof were determined from the aforementioned equation. After the storage, the pigment compositions were each visually inspected for separation, and the state of a cake of pigment composition particles precipitated and deposited onto the bottom of the container was evaluated. The evaluation results were expressed in the following manner:

E (Excellent)>G (Good)>B (Bad)>W (Worst)
Pigments which readily restored initial dispersed state with a low stress are rated at "E", and pigment compositions which coagulated like pudding are rated at "W".

The evaluation results on the water-soluble melamine alkyd resin paints and on the epoxy emulsion resin paints are shown in Tables 4 and 5, respectively.

TABLE 4

Water-soluble melamine alkyd resin paints

| | Initial viscosity (cps) | | | Final viscosity (cps) | | | Sepa-ra-tion | Cake |
|---|---|---|---|---|---|---|---|---|
| | 6 rpm | 60 rpm | TF | 6 rpm | 60 rpm | TF | | |
| Com.Ex. 1 | 340 | 338 | 1.01 | 300 | 308 | 0.97 | No | E |
| Ex.1 | 580 | 516 | 1.12 | 370 | 355 | 1.04 | No | E |

TABLE 4-continued

Water-soluble melamine alkyd resin paints

|  | Initial viscosity (cps) | | | Final viscosity (cps) | | | Sepa-ra-tion | Cake |
|---|---|---|---|---|---|---|---|---|
|  | 6 rpm | 60 rpm | TF | 6 rpm | 60 rpm | TF | | |
| Ex.2 | 620 | 514 | 1.21 | 400 | 386 | 1.04 | No | E |
| Ex.3 | 365 | 332 | 1.10 | 325 | 303 | 1.07 | No | E |
| Ex.4 | 330 | 325 | 1.02 | 325 | 315 | 1.03 | No | E |
| Ex.5 | 325 | 314 | 1.04 | 370 | 336 | 1.10 | No | E |
| Ex.6 | 350 | 340 | 1.03 | 338 | 327 | 1.03 | No | E |
| Ex.7 | 340 | 325 | 1.05 | 321 | 301 | 1.07 | No | E |
| Ex.8 | 355 | 340 | 1.04 | 333 | 315 | 1.06 | No | E |
| Ex.9 | 335 | 320 | 1.05 | 335 | 326 | 1.03 | No | E |
| Ex.10 | 320 | 294 | 1.09 | 288 | 282 | 1.02 | No | E |
| Ex.11 | 338 | 329 | 1.03 | 308 | 294 | 1.05 | No | E |

TABLE 5

Epoxy emulsion resin paints

|  | Initial viscosity (cps) | | | Final viscosity (cps) | | | Sepa-ra-tion | Cake |
|---|---|---|---|---|---|---|---|---|
|  | 6 rpm | 60 rpm | TF | 6 rpm | 60 rpm | TF | | |
| Com.Ex.1 | 120 | 92 | 1.31 | 120 | 52 | 2.31 | No | B |
| Ex.1 | 175 | 148 | 1.18 | 125 | 60 | 2.08 | No | G |
| Ex.2 | 155 | 139 | 1.12 | 100 | 64 | 1.56 | No | G |
| Ex.3 | 163 | 130 | 1.25 | 152 | 80 | 1.90 | No | G |
| Ex.4 | 152 | 142 | 1.07 | 127 | 60 | 2.12 | No | G |
| Ex.5 | 148 | 120 | 1.23 | 116 | 54 | 2.15 | No | G |
| Ex.6 | 140 | 115 | 1.22 | 120 | 60 | 2.00 | No | G |
| Ex.7 | 172 | 152 | 1.13 | 145 | 110 | 1.32 | No | G |
| Ex.8 | 180 | 170 | 1.06 | 156 | 103 | 1.51 | No | G |
| Ex.9 | 115 | 95 | 1.21 | 80 | 45 | 1.78 | No | G |
| Ex.10 | 130 | 110 | 1.18 | 108 | 71 | 1.52 | No | G |
| Ex.11 | 145 | 110 | 1.23 | 107 | 66 | 1.62 | No | G |

3. Method for evaluation of anti-corrosive effect of paint coating and results

The water-soluble melamine alkyd resin paints and the epoxy emulsion resin paints were each applied on a base material of untreated dull steel plate (70 mm×150 mm×0.6 mm) with a bar coater No. 60. The resulting plate was dried at room temperature for 1 hour, then baked at 60° C. for 20 minutes and at 135° C. for 20 minutes, and allowed to stand for 24 hours.

The anti-corrosive effect of the paint coating was evaluated through a salt water spraying test specified in JIS Z2371. The evaluation results on the water-soluble melamine alkyd resin paints and on the epoxy emulsion resin paints are shown in Tables 6 and 7, respectively.

The evaluation was achieved by visual inspection and the results thereof were expressed in the following manner:

G (good)>M (medium)>B (bad)

TABLE 6

Water-soluble melamine alkyd resin paints

|  | Salt water spraying period | | |
|---|---|---|---|
|  | 168 hours | 336 hours | 504 hours |
| Comparative Example 1 | M | B | B |
| Example 1 | M | M | M |
| Example 2 | M | M | M |

TABLE 6-continued

Water-soluble melamine alkyd resin paints

|  | Salt water spraying period | | |
|---|---|---|---|
|  | 168 hours | 336 hours | 504 hours |
| Example 3 | G | M | M |
| Example 4 | G | M | M |
| Example 5 | M | M | M |
| Example 6 | M | M | M |
| Example 7 | G | M | M |
| Example 8 | M | M | M |
| Example 9 | M | M | M |
| Example 10 | M | M | M |
| Example 11 | M | M | M |

TABLE 7

Epoxy emulsion resin paints

|  | Salt water spraying period | | |
|---|---|---|---|
|  | 168 hours | 336 hours | 504 hours |
| Comparative Example 1 | M | B | Discontinued |
| Example 1 | M | G | G |
| Example 2 | M | M | M |
| Example 3 | G | M | M |
| Example 4 | G | G | G |
| Example 5 | M | M | M |
| Example 6 | G | M | M |
| Example 7 | M | M | M |
| Example 8 | M | M | M |
| Example 9 | M | M | M |
| Example 10 | M | M | M |
| Example 11 | G | M | M |

We claim:

1. A strontium borate pigment composition comprising particles of a strontium borate represented by the general formula (1):

$$\alpha SrO \cdot \beta B_2O_3 \cdot \gamma H_2O \quad (1)$$

(wherein $0<\alpha\leq 3$, $0<\beta\leq 4$, $0\leq\gamma\leq 5$), said particles being coated with:

(A) at least one compound selected from the group consisting of compounds represented by the formulae (3) to (6):

$$\eta SrO \cdot \theta Al_2O_3 \cdot \iota H_2O \quad (3)$$

(wherein $0<\eta\leq 5$, $0<\theta\leq 16$, $0\leq\iota\leq 6$)

$$SrSO_4 \quad (4)$$

$$SrCO_3 \quad (5)$$

and $$SrHPO_4 \quad (6);$$

or (B) at least one compound selected from the group recited in (A) and a compound represented by the formula:

$$\delta SrO \cdot \epsilon SiO_2 \cdot \zeta H_2O \quad (2)$$

(wherein $0<\delta\leq 3$, $0<\epsilon\leq 2$, $0\leq\zeta\leq 4$):

said pigment composition having an average particle diameter of 0.1 μm to 5 μm and a water-soluble content of not greater than 15% by weight.

2. A method of producing the strontium borate pigment composition of claim 1, said method comprising the steps of:

reacting a water-soluble strontium salt with boric acid or a water-soluble borate in water to provide an intermediate reaction product; and (A) further reacting the intermediate reaction product with at least one compound selected from the group consisting of aluminum sulfate, sodium sulfate, sodium carbonate and ammonium dihydrogenphosphate or (B) further reacting the intermediate reaction product with at least one compound selected from the group recited in (A) and a water-soluble silicate.

3. A process of imparting anti-corrosive properties to a material, the process comprising the step of blending a strontium borate pigment composition with the material, said strontium borate pigment composition comprising particles of a strontium borate represented by the general formula (1):

$$\alpha SrO \cdot \beta B_2O_3 \cdot \gamma H_2O \quad (1)$$

(wherein $0<\alpha \leq 3$, $0<\beta \leq 4$, $0 \leq \gamma \leq 5$), said particles being coated with:
(A) at least one compound selected from the group consisting of compounds represented by the formulae (3) to (6):

$$\eta SrO \cdot \theta Al_2O_3 \cdot \iota H_2O \quad (3)$$

(wherein $0<\eta \leq 5$, $0<\theta \leq 16$, $0 \leq \iota \leq 6$)

$$SrSO_4 \quad (4)$$

$$SrCO_3 \quad (5)$$

and $$SrHPO_4 \quad (6);$$

or (B) at least one compound selected from the group recited in (A) and a compound represented by the formula:

$$\delta SrO \cdot \epsilon SiO_2 \cdot \zeta H_2O \quad (2)$$

(wherein $0<\delta \leq 3$, $0<\epsilon \leq 2$, $0 \leq \zeta \leq 4$):

said pigment composition having an average particle diameter of 0.1 μm to 5 μm and a water-soluble content of not greater than 15% by weight.

4. A process as set forth in claim 3, wherein the strontium borate pigment composition is prepared by reacting a water-soluble strontium salt with boric acid or a water-soluble borate in water to provide an intermediate reaction product; and (A) further reacting the intermediate reaction product with at least one compound selected from the group consisting of aluminum sulfate, sodium sulfate, sodium carbonate and ammonium dihydrogenphosphate or (B) further reacting the intermediate reaction product with at least one compound selected from the group recited in (A) and a water-soluble silicate.

5. A process of imparting anti-bacterial properties, anti-fungal properties or both anti-bacterial and anti-fungal properties to a material, the process comprising the step of blending a strontium borate pigment composition with the material, said strontium borate pigment composition comprising particles of a strontium borate represented by the general formula (1):

$$\alpha SrO \cdot \beta B_2O_3 \cdot \gamma H_2O \quad (1)$$

(wherein $0<\alpha \leq 3$, $0<\beta \leq 4$, $0 \leq \gamma \leq 5$), said particles being coated with:
(A) at least one compound selected from the group consisting of compounds represented by the formulae (3) to (6):

$$\eta SrO \cdot \theta Al_2O_3 \cdot \iota H_2O \quad (3)$$

(wherein $0<\eta \leq 5$, $0<\theta \leq 16$, $0 \leq \iota \leq 6$)

$$SrSO_4 \quad (4)$$

$$SrCO_3 \quad (5)$$

and $$SrHPO_4 \quad (6);$$

or (B) at least one compound selected from the group recited in (A) and a compound represented by the formula:

$$\delta SrO \cdot \epsilon SiO_2 \cdot \zeta H_2O \quad (2)$$

(wherein $0<\delta \leq 3$, $0<\epsilon \leq 2$, $0 \leq \zeta \leq 4$):

said pigment composition having an average particle diameter of 0.1 μm to 5 μm and a water-soluble content of not greater than 15% by weight.

6. A process as set forth in claim 5, wherein the strontium borate pigment composition is prepared by reacting a water-soluble strontium salt with boric acid or a water-soluble borate in water to provide an intermediate reaction product; and (A) further reacting the intermediate reaction product with at least one compound selected from the group consisting of aluminum sulfate, sodium sulfate, sodium carbonate and ammonium dihydrogenphosphate or (B) further reacting the intermediate reaction product with at least one compound selected from the group recited in (A) and a water-soluble silicate.

7. A process of imparting non-flammable properties to a material, the process comprising the step of blending a strontium borate pigment composition with the material, said strontium borate pigment composition comprising particles of a strontium borate represented by the general formula (1):

$$\alpha SrO \cdot \beta B_2O_3 \cdot \gamma H_2O \quad (1)$$

(wherein $0<\alpha \leq 3$, $0<\beta \leq 4$, $0 \leq \gamma \leq 5$), said particles being coated with:
(A) at least one compound selected from the group consisting of compounds represented by the formulae (3) to (6):

$$\eta SrO \cdot \theta Al_2O_3 \cdot \iota H_2O \quad (3)$$

(wherein $0<\eta \leq 5$, $0<\theta \leq 16$, $0 \leq \iota \leq 6$)

$$SrSO_4 \quad (4)$$

$$SrCO_3 \quad (5)$$

and $$SrHPO_4 \quad (6);$$

or (B) at least one compound selected from the group recited in (A) and a compound represented by the formula:

$$\delta SrO \cdot \epsilon SiO_2 \cdot \zeta H_2O \quad (2)$$

(wherein $0<\delta\leq 3$, $0<\epsilon\leq 2$, $0\leq\zeta\leq 4$):

said pigment composition having an average particle diameter of 0.1 μm to 5 μm and a water-soluble content of not greater than 15% by weight.

8. A process as set forth in claim 7, wherein the strontium borate pigment composition is prepared by reacting a water-soluble strontium salt with boric acid or a water-soluble borate in water to provide an intermediate reaction product; and (A) further reacting the intermediate reaction product with at least one compound selected from the group consisting of aluminum sulfate, sodium sulfate, sodium carbonate and ammonium dihydrogenphosphate or (B) further reacting the intermediate reaction product with at least one compound selected from the group recited in (A) and a water-soluble silicate.

* * * * *